United States Patent
Sinusas et al.

(10) Patent No.: US 10,875,636 B2
(45) Date of Patent: Dec. 29, 2020

(54) VARIABLE-PITCH RINGED ROTORS FOR AIRCRAFT

(71) Applicant: Bell Helicopter Textron Inc., Fort Worth, TX (US)

(72) Inventors: Eric Albert Sinusas, Southlake, TX (US); Thomas C. Parham, Jr., Colleyville, TX (US); Albert Gerard Brand, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 65 days.

(21) Appl. No.: 16/196,950

(22) Filed: Nov. 20, 2018

(65) Prior Publication Data

US 2020/0156775 A1    May 21, 2020

(51) Int. Cl.
| | | |
|---|---|---|
| *B64C 11/06* | (2006.01) |
| *F04D 29/32* | (2006.01) |
| *B64C 27/20* | (2006.01) |
| *B64C 27/46* | (2006.01) |
| *B64C 27/00* | (2006.01) |
| *B64C 27/51* | (2006.01) |
| *B64C 27/473* | (2006.01) |

(52) U.S. Cl.
CPC ............ *B64C 27/20* (2013.01); *B64C 27/001* (2013.01); *B64C 27/463* (2013.01); *B64C 27/473* (2013.01); *B64C 27/51* (2013.01); *F04D 29/326* (2013.01); *F05D 2240/307* (2013.01)

(58) Field of Classification Search
CPC ..... B64C 27/20; B64C 27/463; B64C 27/473; B64C 27/51; F05D 2240/307; F04D 29/326
See application file for complete search history.

(56) References Cited

U.S. PATENT DOCUMENTS

| | | | | |
|---|---|---|---|---|
| 3,122,342 | A * | 2/1964 | Weir ....................... | B64C 27/52 244/17.11 |
| 6,086,016 | A * | 7/2000 | Meek ...................... | B64C 27/02 244/17.11 |
| 6,659,395 | B2 * | 12/2003 | Rehkemper ............ | A63H 27/12 244/17.11 |
| 7,927,065 | B2 * | 4/2011 | Moehring .............. | F03D 1/0658 415/173.1 |
| 8,181,755 | B2 * | 5/2012 | Stamps ................... | B64C 27/35 188/290 |
| 9,272,779 | B2 * | 3/2016 | Groenewald ........... | B64C 27/10 |

* cited by examiner

*Primary Examiner* — Ninh H. Nguyen
(74) *Attorney, Agent, or Firm* — Lightfoot & Alford PLLC

(57) ABSTRACT

A rotor system for a rotorcraft has a hub rotatable about an axis and a plurality of blades coupled to the hub for rotation therewith about the axis. Each blade is capable of rotation about a pitch axis relative to the hub, and a ring couples adjacent blades to each other.

20 Claims, 8 Drawing Sheets

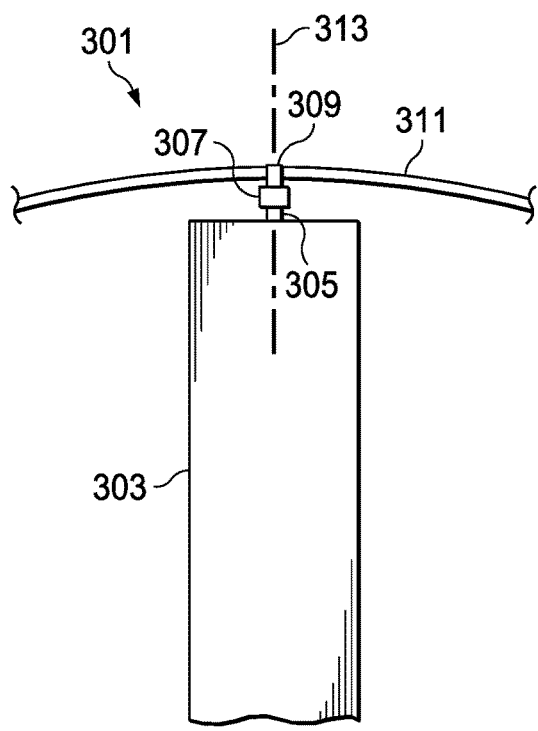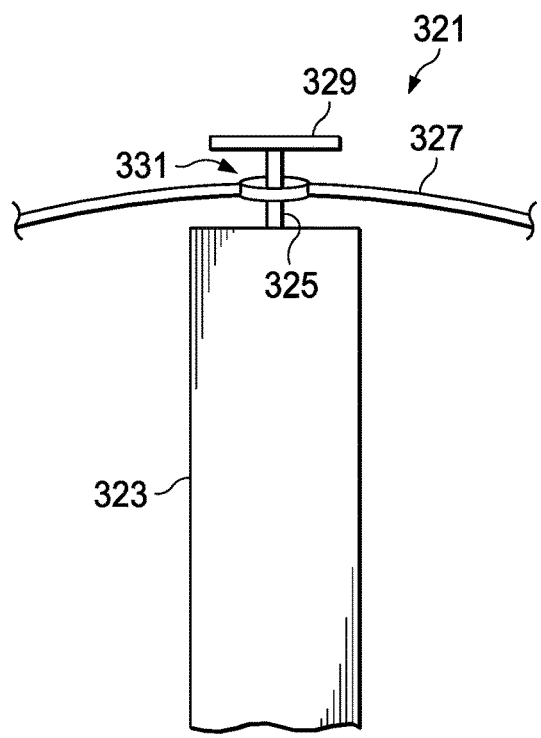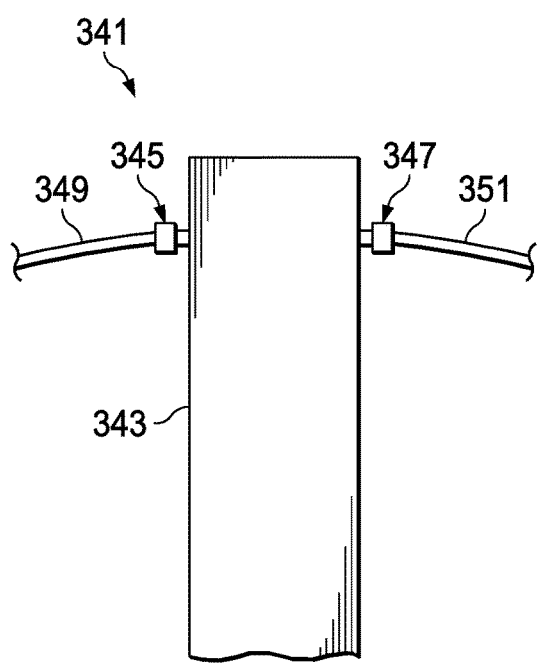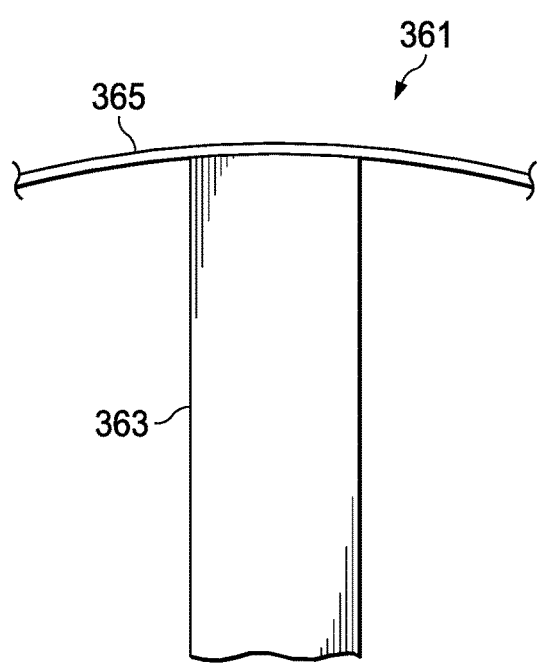

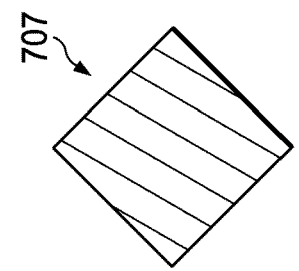
FIG. 7C
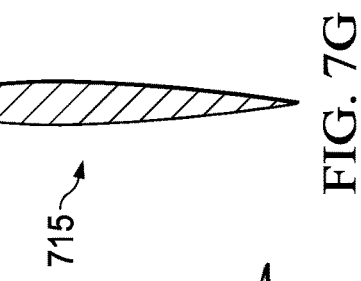
FIG. 7G
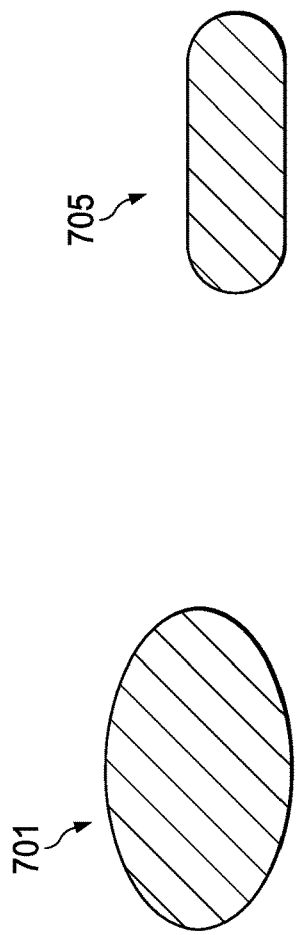
FIG. 7A
FIG. 7B
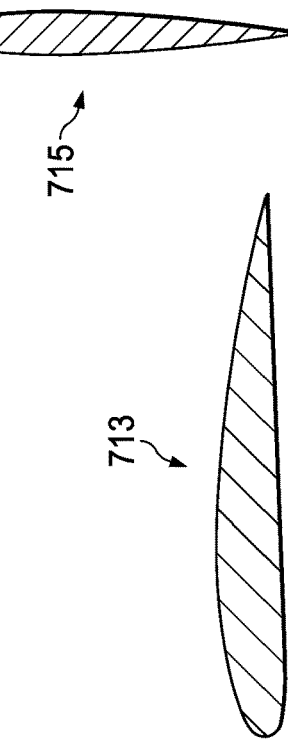
FIG. 7F
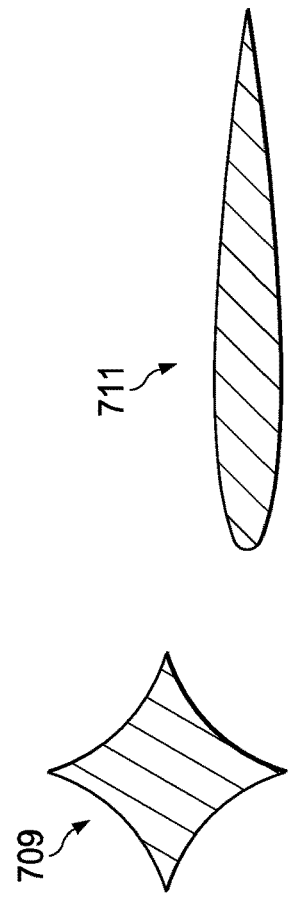
FIG. 7E
FIG. 7D

VARIABLE-PITCH RINGED ROTORS FOR AIRCRAFT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

In certain cases, a single engine rotorcraft, such as a helicopter, may have reduced payload capacity if autorotation capabilities are limited at high gross weight. In such cases, increasing the inertia of the rotor system can increase the autorotation capability at higher gross weight and thereby the payload. Because increasing the weight of the rotor blades increases the rotational inertia of the rotor system, the autorotation capabilities are increased by increasing the rotor weight. Blade weight is particularly effective at increasing the blade rotational inertia if it is applied near the blade tip.

To increase rotational inertia, conventional rotor systems can utilize weights located internal to the rotor blades, but a limitation of conventional weighted rotor blades is the amount of weight that can be located internal to the blade and located proximate to the tip of the rotor blade. Subsequent increases in blade weight require the weight to be added further inboard from the tip, which, pound for pound, is much less effective at increasing the blade's rotational inertia. Additionally, focusing too much internal weight at the blade tip would require adding mass in an unfavorable chordwise position, causing the center of gravity of that weight to shift toward the trailing edge and destabilizing the blade. Though they may provide a benefit for rotational inertia, weights located in the rotor blade inevitably cause increased centrifugal force (CF) loads on rotor components.

Some rotorcraft feature a stationary duct located proximate to the tips of the rotor blades. The stationary duct increases crew safety by reducing the chance of someone walking into a rotor system and can also provide increased rotor efficiency. However, the size of a gap between the rotor tips and the stationary duct affects the rotor efficiency and noise produced during operation.

BRIEF DESCRIPTION OF THE DRAWINGS

FIGS. 3A-3D are partially enlarged plan views of blade-to-ring interfaces according to this disclosure.

FIGS. 7A-7G are cross-section views of portions of rings according to this disclosure.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure describes ringed rotors comprising rigid and non-rigid rings. The ring increases the rotational inertia of the rotor system and furthermore places the added weight at or near the tips of the blades for maximum weight effectiveness. The ring is coupled to the blades of a rotor and rotates together with the blades about a mast axis. The ring may be small in cross-section, such as a filament coupling the rotor tips, or large, such as, for example, a ring having the form of a duct. The ring can be a rigid ring coupling the rotor blade tips or a flexible or jointed ring. The ring can also incorporate a system featuring adaptive elements for changing a length of a periphery of the ring. Hoop stress will help to offset CF loading of the blades during rotation.

Various rotorcraft, such as electric drones, use fixed-pitch rotors and control thrust with variable RPM. Small scale "toy" rotorcraft can have a ring coupling the blades, but the ring is typically intended for safety or structural benefits that prevent blade breakage in an impact and is an integral component of the rotor. A variable RPM rotor can benefit from low rotational inertia because a low inertia system is more responsive to a thrust change when varying the RPM. Because of this, the ring of a fixed-pitch, variable RPM rotor is preferably low in weight and not intended to provide additional inertia for autorotation.

Figure 1:
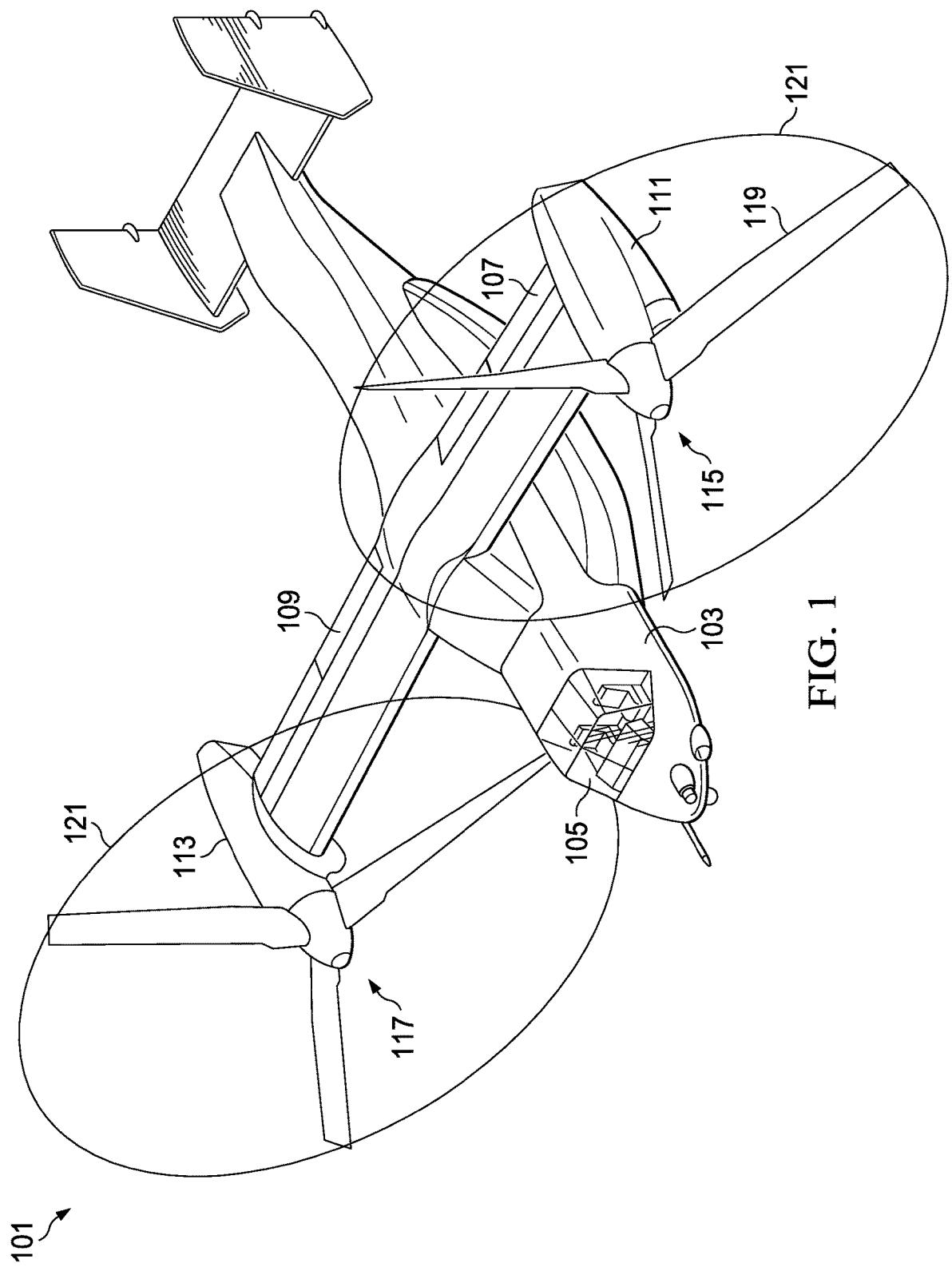
FIG. 1 is an oblique view of a tiltrotor according to this disclosure.

FIG. 1 illustrates a tiltrotor aircraft 101 equipped with a ringed rotor according to this disclosure. Aircraft 101 has a fuselage 103 with a cockpit 105 located in a forward portion of fuselage 103. Wings 107, 109 are attached to fuselage 103, and an engine nacelle 111, 113 is rotatably attached to the outer end of each wing 107, 109, respectively. Each nacelle 111, 113 houses an engine (not shown), which is operably connected to a rotatable proprotor 115, 117. Each proprotor 115, 117 comprises three blades 119. Proprotors 115, 117 rotate in opposite directions and comprise similar components, though components in proprotors 115, 117 may be constructed and installed in a mirror, or reverse, manner from the opposite proprotor 115, 117.

Ring 121 is coupled to the tips of rotor blades 119 for coupling adjacent blades 119 to each other. An interface between each rotor blade 119 and the ring 121 allows for the rotor blades 119 to be rotated in pitch and may allow the blades 119 to flap. The ring stabilizes the rotor by preventing lead-lag of the rotor blade 119. In some embodiments the ring 121 may float freely in the radial direction, with the centrifugal force of the ring's mass being carried entirely by the circumferential stress within the ring. In this embodiment, no additional CF is applied to the blades by the ring.

This embodiment would still allow transmittal of non-radial force between blades 119 along the ring 121 attachment. As shown, the ring 121 is comprised of a steel cable attached to the tips of blades 119 of the proprotors 115, 117.

Figure 2:
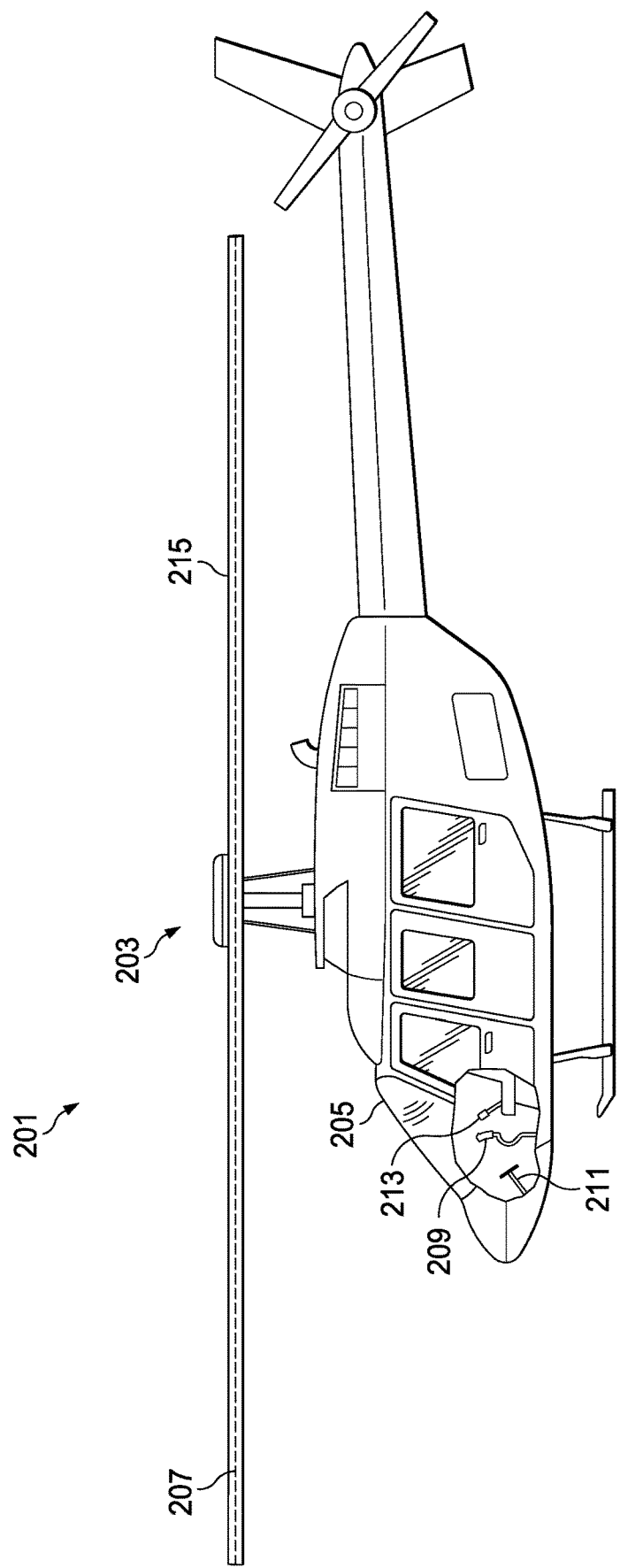
FIG. 2 is a side view of a helicopter according to this disclosure.

FIG. 2 illustrates a rotorcraft 201 equipped with a ringed rotor according to this disclosure. Rotorcraft 201 comprises a rotor system 203 carried by a fuselage 205. One or more rotor blades 207 operably associated with rotor system 203 provide lift for rotorcraft 201 and are controlled with a plurality of control sticks within fuselage 205. For example, during flight a pilot can manipulate the cyclic stick 209 for cyclically changing the pitch angle of rotor blades 207, thus providing lateral and longitudinal flight direction, and/or manipulate pedals 211 for controlling yaw direction. Furthermore, the pilot can adjust the collective stick 213, thereby collectively changing the pitch angles of all the rotor blades concurrently.

Ring 215 is attached to the tips of rotor blades 207 for coupling adjacent blades 207 to each other. An interface between the rotor blades 207 and the ring 215 allows for the rotor blades 207 to be rotated in pitch and may allow the blades 207 to flap and lead-lag. In some embodiments, the ring 215 is inflexible or rigid, and allows forces from one rotor blade 207 to be transmitted to another rotor blade 207. As shown, the ring 215 is rigid and is comprised of an airfoil shaped composite material attached to the rotor tips of the rotor system 203.

FIGS. 3A through 3D illustrate examples of blade-to-ring interfaces according to this disclosure, though other appropriate interfaces may be used.

FIG. 3A illustrates a single flexible interface of a ringed rotor according to this disclosure. Interface 301 comprises a rotor blade 303, a first member 305, a bearing 307, a second member 309, and a ring 311. First member 305 protrudes from an end of the rotor blade 303 opposite a rotor hub (not shown) and is preferably located along a pitch axis of the rotor blade 303. However, other locations are contemplated by this application, such as being closer to a leading edge. Second member 309 is affixed to the ring 311. First member 305 is rotationally coupled to the second member 309 by the bearing 307, which allows the rotor blade 303 to pivot relative to the ring 311 about at least one axis, such as a pitch axis 313. In some embodiments the bearing 307 is a plain bearing configured for rotation about a single axis, whereas in alternative embodiments the bearing 307 is another type of bearing, such as, for example, a spherical bearing, configured for allowing rotation about multiple axes.

FIG. 3B illustrates a single pivoting interface of a ringed rotor according to this disclosure. Interface 321 comprises a rotor blade 323, a first member 325, and a ring 327. First member 325 protrudes from an end of the rotor blade 323 opposite a rotor hub (not shown) and is preferably located along a pitch axis of the rotor blade 323. First member 325 also features a cap 329. Ring 327 comprises an aperture 331 with a radial axis, and first member 325 extends through the aperture 331, the cap 329 retaining the first member 325. The cap 329 is larger than aperture 331, thereby allowing relative motion between the blade 323 and the ring 327 while retaining the ring 327 to the blade 323.

FIG. 3C illustrates a dual pivoting interface of a ringed rotor according to this disclosure. Interface 341 comprises a rotor blade 343, a first coupling 345, a second coupling 347, a first ring section 349, and a second ring section 351. The first ring section 349 is pivotally coupled to the first coupling 345, and the second ring section 351 is pivotally coupled to the second coupling 347. The dual pivoting interface of the first coupling 345 and the second coupling 347 allows the rotor blade 343 to pivot relative to the ring sections 349, 351. While the ring sections 349, 351 are illustrated inboard from the end of the rotor blade 343 and are on a leading edge and a trailing edge of the rotor blade 343 respectively, it should be apparent that the ring sections 349, 351 may be located outboard of the tip of the rotor blade 343 or at the tip of the blade 343.

FIG. 3D illustrates a non-pivoting interface of a ringed rotor according to this disclosure. Interface 361 comprises a rotor blade 363 and a ring 365. Ring 365, while flexible, is rigidly attached to the rotor blade 363 without the ability for the rotor blade 363 to pivot relative to the ring 365. While the ring 365 is illustrated at the tip of the rotor blade 363, it should be apparent that the ring 365 may be located outboard the end of the rotor blade 363.

Figure 4:
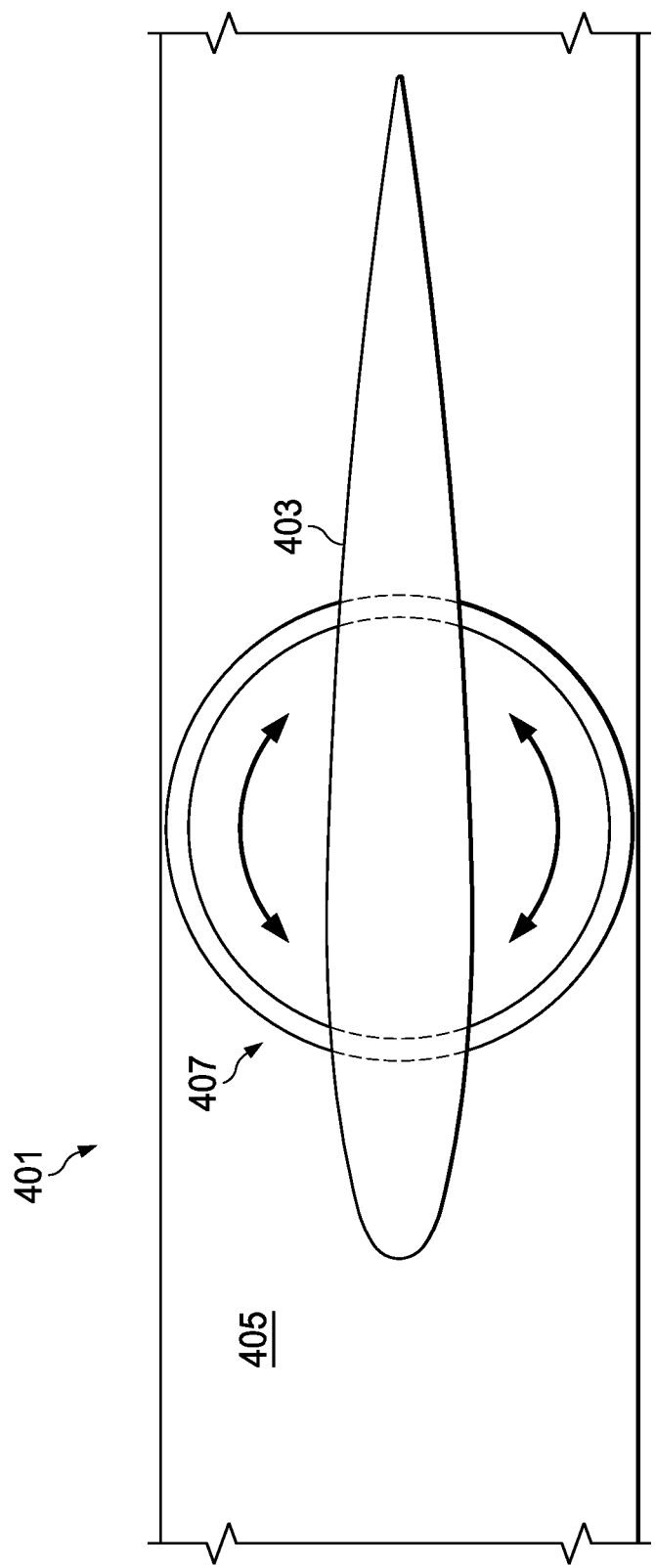
FIG. 4 is a partial view of a blade-to-ring interface according to this disclosure.

FIG. 4 illustrates an alternative pivoting interface of a ringed rotor according to this disclosure from an inboard point of view looking radially outboard. Interface 401 comprises a rotor blade 403, a ring 405, and a bearing 407 located between the rotor blade 403 and the ring 405. One element of the bearing 407 is affixed to the ring 405, and another element of the bearing 407 is affixed to the rotor blade 403. The bearing 407 allows the rotor blade 403 to rotate about the bearing axis relative to the ring 405. While a radial bearing is illustrated, other types of bearings, such as, for example, a spherical bearing, are also contemplated by this application. Pivoting and rotating of the rotor blade 403 relative the ring 405 allows the pitch of the rotor blade 403 to be adjusted with a conventional swashplate assembly.

FIGS. 5A through 5D illustrate schematic plan views of examples of configurations of ringed rotors according to this disclosure, though other appropriate configurations may be used.

Figure 5A:
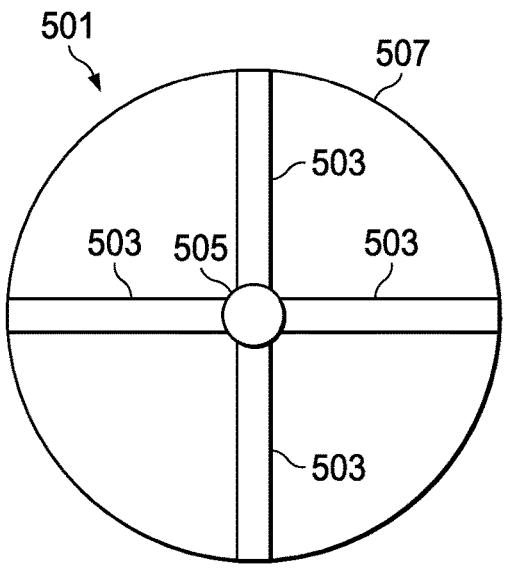
FIGS. 5A-5D are plan views of rotors according to this disclosure.

FIG. 5A illustrates a circular ring of a ringed rotor according to this disclosure. Rotor system 501 is comprised of a plurality of rotor blades 503, a rotor hub 505, and a ring 507. Ring 507 is circular in shape during rotation of the rotor system 501 as the CF force on the ring 507 pulls the ring away from the rotor hub 505. A circumference of the ring 507 is selected such that at 100% RPM a radius between an axis of rotation of the rotor system 501 and anywhere along the ring is equal.

Figure 5B:
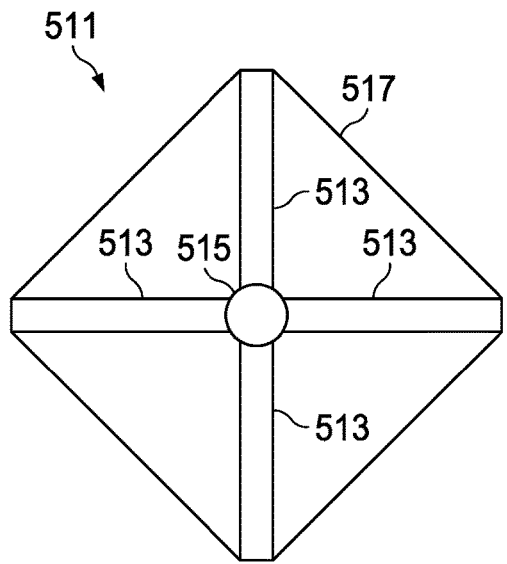

FIG. 5B illustrates a rectangular ring of a ringed rotor according to this disclosure. Rotor system 511 is comprised of a plurality of rotor blades 513, a rotor hub 515, and a ring 517. Ring 517 is rectangular during rotation of the rotor system 511 as the CF force on the ring 517 pulls the ring away from the rotor hub 515. The rectangular configuration may be used with a rigid ring 517, or for a flexible ring 517 a preload is applied to remove slack in ring 517 between the rotor blades 513. At 100% RPM a radius between an axis of rotation of the rotor system 511 is maximized along a longitudinal axis of the rotor blades 513 and minimized at a median between the rotor blades 513.

Figure 5C:
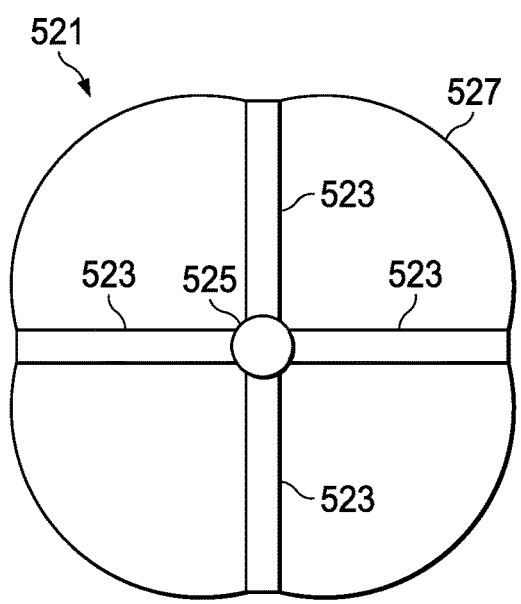

FIG. 5C illustrates a cloverleaf ring of a ringed rotor according to this disclosure. Rotor system 521 is comprised of a plurality of rotor blades 523, a rotor hub 525, and a ring 527. Ring 527 is cloverleaf shaped in plan view during rotation of the rotor system 521 as the CF force on the ring 527 pulls any unsupported portions of the ring 527 away from the rotor hub 525. Additional circumference to the ring 527 is added to induce slack between the rotor blades 523. A circumference of the ring 527 is selected, such that at 100% RPM a radius between an axis of rotation of the rotor system 521 is minimized along an axis of the rotor blades 523 and maximized at a median between the rotor blades 523.

Figure 5D:
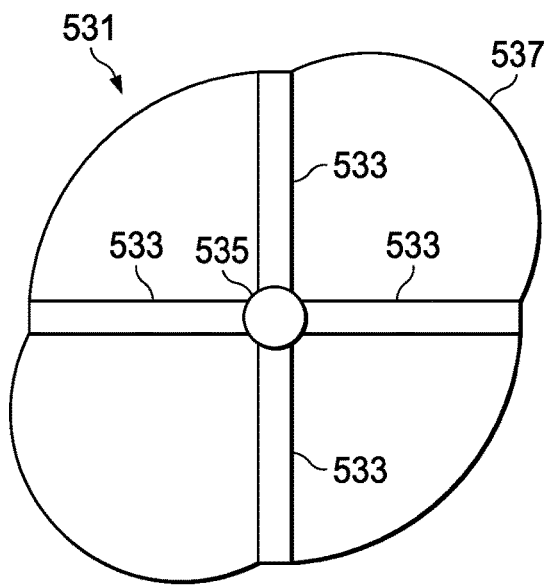

FIG. 5D illustrates an adaptive ring of a ringed rotor according to this disclosure. Rotor system 531 is comprised of a plurality of rotor blades 533, a rotor hub 535, and a ring 537. Ring 537 is adaptive during rotation of the rotor system 531 as the CF force on the ring 537 pulls the ring away from the rotor hub 535. Additional circumference to the ring 537 is added during operation to induce slack between pairs of the rotor blades 533, thereby allowing the ring to be adjustable. A circumference of the ring 537 is adapted during flight such that at 100% RPM a radius between an axis of rotation of the rotor system 531 is minimized along an axis of the rotor blades 533 and maximized at a median between the rotor blades 533. Typically, an actuator, or some other active element, is located in line of the ring 537 to enable the selective circumference of the ring 537. It should be noted that the ring 537 can act as, or incorporate, dampening capability that replaces, or augments, conventional rotor dampers that located near the root of the blade at the rotor hub. Dampening the rotor system from the ring 537 may provide a simpler and lighter solution than conventional dampers that attach near the blade root.

FIGS. 6A through 6D illustrate examples of types of rings for use with ringed rotors according to this disclosure, though other appropriate types may be used. Some of the embodiments shown have a circular cross-sectional shape, though other shapes may be used, and selected shapes may reduce noise and/or drag caused by the ring.

Figure 6A:
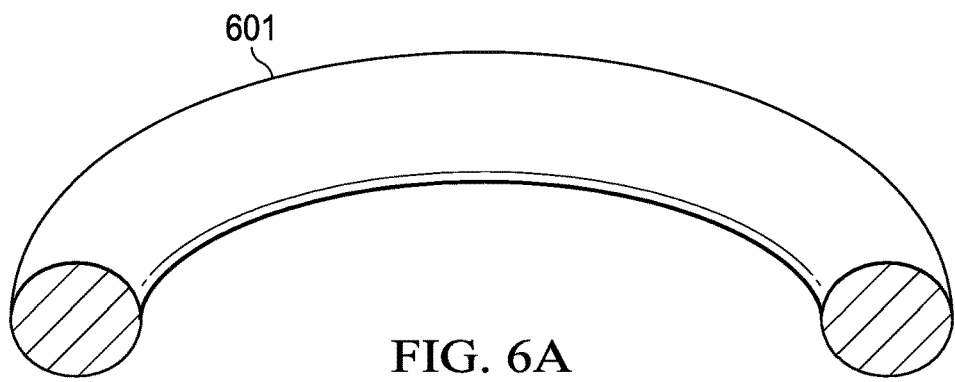
FIGS. 6A-6D are oblique section views of portions of rings according to this disclosure.

FIG. 6A illustrates a partial ring of a ringed rotor according to this disclosure. Ring 601 is comprised of a steel cable that is solid throughout the section of the ring 601. Ring 601 is typically a single strand of wire flexible enough to allow movement of blades relative to other blades. Ring 601 features a cross-sectional shape that is circular.

Figure 6B:
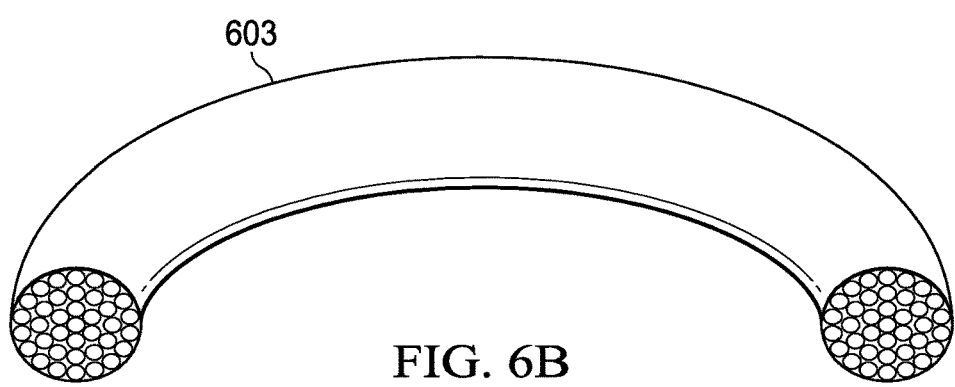

FIG. 6B illustrates a partial ring of a ringed rotor according to this disclosure and comprised of a steel cable. Ring 603 is comprised of a plurality of strands of steel wire flexible enough to allow movement of blades relative to other blades. Ring 603 features a cross-sectional shape that is circular. In alternative embodiments, one of the strands of the steel wire is resistive and configured to generate heat upon current being applied to the resistive strand of wiring to melt ice that forms on the ring.

Figure 6C:
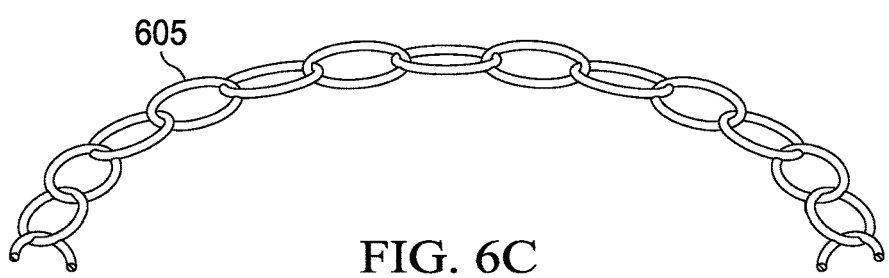

FIG. 6C illustrates a partial ring of a ringed rotor according to this disclosure and comprised of a flexible chain. Ring 605 is comprised of a steel chain having a plurality of interconnected links. The ring 605 is flexible enough to allow movement of blades relative to other blades. Other embodiments feature a laminate of steel and elastomeric material layers to form a flexible cable.

Figure 6D:
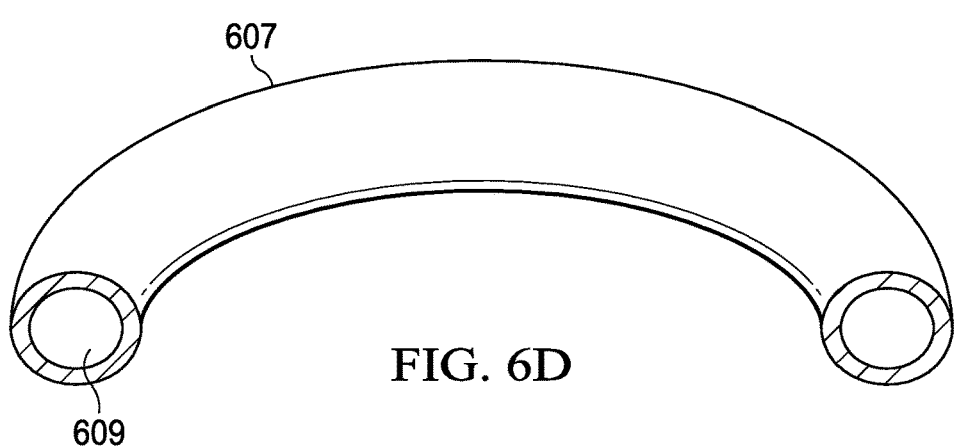

FIG. 6D illustrates a partial ring of a ringed rotor according to this disclosure and comprised of a rigid hollow structure. Ring 607 is preferably formed from composite materials and has an annular internal cavity 609 in the ring 607. As shown, ring 607 features a cross-sectional shape that is circular.

FIGS. 7A through 7F illustrate examples of cross-sectional shapes of rings for ringed rotors according to this disclosure. The group of examples shown is not exhaustive, and other appropriate shapes may be used. Rings formed using cross-sectional shapes other than circular may utilize the shape in any appropriate orientation relative to the rotor blades.

FIG. 7A illustrates a cross-section of an oblong-shaped ring 701, and FIG. 7B illustrates a cross-section of an oval-shaped ring 705. FIG. 7C illustrates a cross-section of a rectangular-shaped ring 707, and FIG. 7D illustrates a cross-section of a fluted ring 709. FIG. 7E illustrates a cross-section of a symmetrical-airfoil-shaped ring 711, FIG. 7F illustrates a cross-section of an asymmetrical-airfoil-shaped ring 713, and FIG. 7G illustrates how the cross-section of ring 715 can be predominately out of the rotor plane, which may be especially desirable for a tiltrotor. The cross-sectional shapes, such as the airfoils or other shapes that extend out of the rotor plane may be used to create a ducted-rotor effect in addition to adding inertia to the rotor. It should be noted that the cross-sectional properties can vary at different cross-section locations, such that the ring can be intentionally designed with varying stiffness, cross-sections, etc around its circumference.

Figure 8:
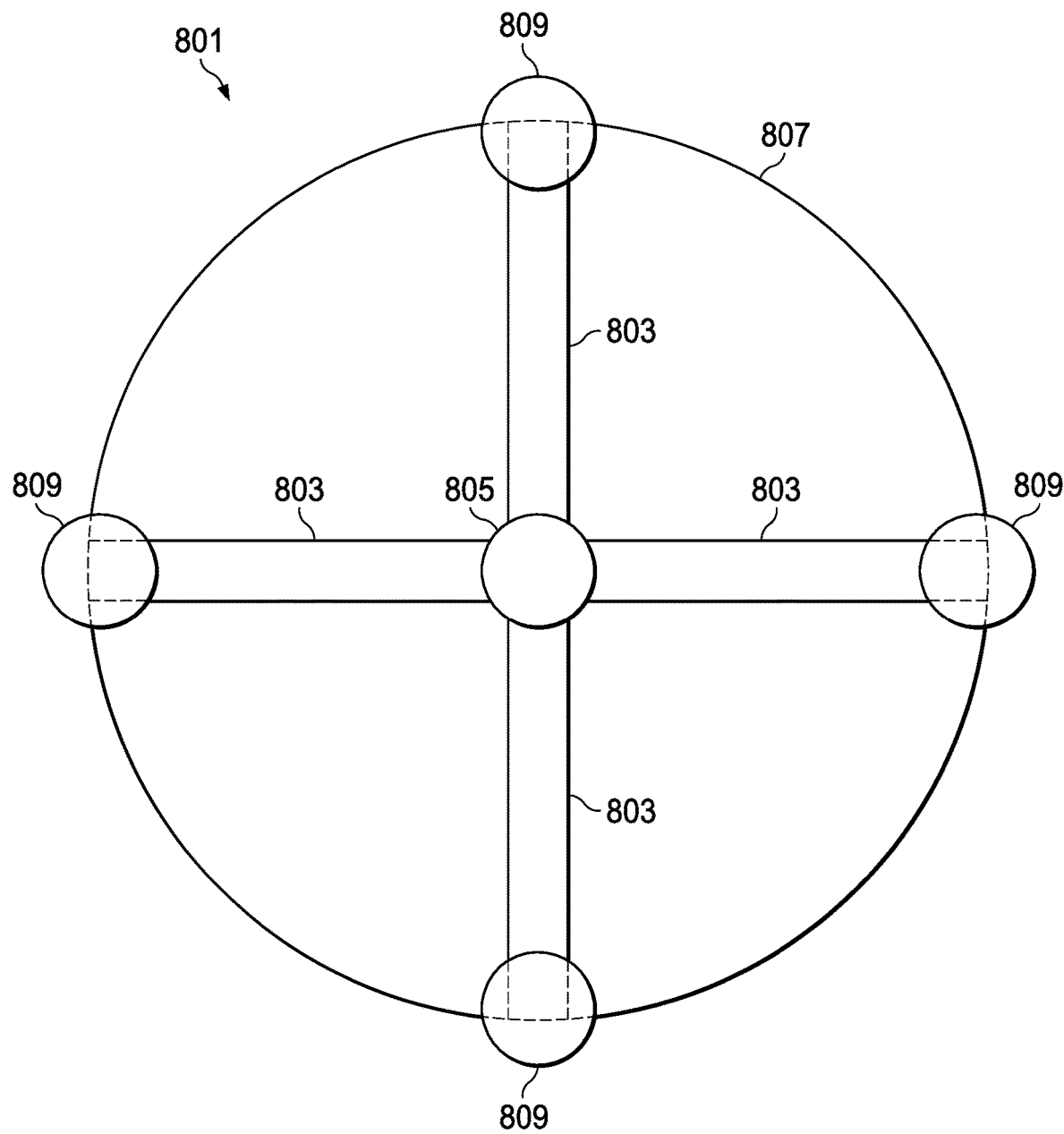
FIG. 8 is a plan view of a ringed rotor system having shrouds according to this disclosure.

FIG. 8 illustrates a noise-reduced ringed rotor according to this disclosure. Rotor system 801 is comprised of a plurality of rotor blades 803, a rotor hub 805, a ring 807, and a plurality of shrouds 809. The rotor hub 805 drives the plurality of rotor blades 803. Ring 807 connects each blade of the plurality of blades 803 to an adjacent blade. A shroud 809 is located where the ring 807 and the plurality of rotor blades 803 interconnect. Each shroud 809 is comprised of an upper and lower aerodynamic member having the ring 807 sandwiched between the upper and lower aerodynamic members. The plurality of shrouds 809 reduces the acoustic effects of attaching a ring to the end of a rotor blade.

It should be noted that the mass of the ringed rotor increases the autorotation capabilities of the rotorcraft by increasing the inertia of the rotor system. Rotorcraft having better autorotation capabilities feature an increased useful load and may feature reduced noise because of lower RPM and tip speed. Since the entire mass of the ring is at (or outboard of) the blade tip the ring's mass has maximum effect on increasing the rotor system inertia. In some embodiments, the ring can completely react its own CF via tension that develops in the ring, in other embodiments, some of the CF loading of the blades of a ringed rotor may be reacted by the ring, thereby reducing the required size of the rotor hub and CF bearings. Some embodiments of ringed-rotor systems can be designed without droop stops because rigid rings can prevent blades from drooping during low-CF periods. Ringed-rotor systems for helicopters and drones may also have a safety benefit by inhibiting people and items from entering the plane of the rotor, thereby saving people, rotor blades, and items from damage.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_{11}$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor system for a rotorcraft, the rotor system comprising:
   a hub rotatable about an axis;
   a plurality of blades coupled to the hub for rotation therewith about the axis, each blade being capable of rotation about a pitch axis relative to the hub;
   a ring coupling adjacent blades to each other;
   a plurality of first bearings, each first bearing pivotally coupling the ring to a leading edge of one of the blades; and
   a plurality of second bearings, each second bearing pivotally coupling the ring to a trailing edge of one of the blades.

2. The system of claim 1, wherein the ring is configured to react its own centrifugal force.

3. The system of claim 1, further comprising:
   a rotor dampening system located near the ring.

4. The system of claim 1, wherein each bearing is radial and is configured to allow one axis of rotation.

5. The system of claim 1, wherein each bearing is spherical.

6. The system of claim 1, wherein the ring is formed from a plurality of ring sections, and each ring section is rigid.

7. The system of claim 1, wherein the circumference of the ring is adjustable.

8. The system of claim 1, wherein a cross-sectional property of the ring varies at different circumferential locations.

9. The system of claim 1, further comprising:
   a plurality of shrouds, each shroud covering an interface between the ring and one of the plurality of blades.

10. The system of claim 1, wherein the circumferential shape of the ring during use is one of a circle, a diamond, and a cloverleaf.

11. The system of claim 1, wherein the ring forms a rotor duct that rotates with the plurality of blades.

12. A rotorcraft having a rotor system comprising a plurality of blades driven by a hub, the rotorcraft comprising:
   a ring coupling the plurality of blades together at a tip portion of each of the plurality of blades;
   wherein the ring comprises at least one of:
      an adjustable circumference;
      a cross-sectional property that varies at different circumferential locations; and
      a plurality of shrouds, each shroud covering an interface between the ring and one of the plurality of blades.

13. The rotorcraft of claim 12, wherein the ring is a flexible chain.

14. The rotorcraft of claim 12, wherein the ring is a flexible cable.

15. The rotorcraft of claim 12, wherein a preload is applied to the ring during installation.

16. The rotorcraft of claim 12, wherein the ring forms a rotor duct that rotates with the plurality of blades.

17. The rotorcraft of claim 12, further comprising:
   a bearing rotationally coupling each of the plurality of blades to the ring.

18. The rotorcraft of claim 12, further comprising:
   an interface located between each blade of the plurality of blades and the ring, the interface comprising;
      a first member extending from the blade; and
      an aperture located in the ring;
   wherein the first member extends through the aperture of the ring.

19. A method of adding inertia to the rotor of a rotorcraft, the method comprising:
   coupling adjacent blades of the rotor with a ring; and
   adjusting the circumference of the ring.

20. The method of claim 19, wherein the circumference is adjusted to cause the circumferential shape of the ring during use to be one of a circle, a diamond, and a cloverleaf.

* * * * *